United States Patent [19]

Knobel

[11] 4,070,902
[45] Jan. 31, 1978

[54] ATTACHMENT FOR AIR GAUGING APPARATUS

[76] Inventor: Max Knobel, 453 Beacon St., Boston, Mass. 02115

[21] Appl. No.: 747,804

[22] Filed: Dec. 6, 1976

[51] Int. Cl.² ............................................. G01B 13/06
[52] U.S. Cl. ..................................................... 73/37.5
[58] Field of Search ...................... 73/37.5, 37.6, 37.7, 73/37.8, 37.9, 105; 33/DIG. 2, 147 L

[56] References Cited

U.S. PATENT DOCUMENTS

| | | | |
|---|---|---|---|
| 2,398,958 | 4/1946 | Pellettere | 73/37.5 |
| 3,194,055 | 7/1965 | Knobel | 73/37.5 |

FOREIGN PATENT DOCUMENTS 1,965,231  12/1969  Germany ............................... 73/37.5

Primary Examiner—Charles A. Ruehl
Assistant Examiner—Joseph W. Roskos
Attorney, Agent, or Firm—Morse, Altman, Oates & Bello

[57] ABSTRACT

An attachment is provided for mounting over the nozzle tip of an air gauge follower system to permit use of the system in gauging thin, fragile sheet stock or work having a rough or irregular surface. The attachment includes a thin, flexible diaphragm mounted by means of a collar over the tip of the nozzle in the air gauging apparatus. The diaphragm normally closes the nozzle port and expands out against the work when air pressure is applied through the nozzle forming the air gap which controls the measuring device.

4 Claims, 7 Drawing Figures

ATTACHMENT FOR AIR GAUGING APPARATUS

BACKGROUND OF THE INVENTION

1. Field of the Invention

This invention relates generally to air gauging equipment and more particularly is directed towards a new and improved attachment for the nozzle of air gauging apparatus to adapt the apparatus for use with thin, fragile films and rough or irregular surfaces.

2. Description of the Prior Art

Extremely precise gauging of travelling webs, sheet strips, and the like, can be made without physically contacting the work by use of an air follower of the sort disclosed in my U.S. Pat. No. 3,194,055. The follower is a pneumatic servo-mechanism which provides non-contact gauging with only a stream of air touching the part to be measured. The air gap between the nozzle tip and the work controls the position of the piston in a double-acting air cylinder. A shaft connected to the piston drives the displacement measuring device, typically a dial indicator.

The air stream delivered from the nozzle typically is supplied at 35 psi, which, while useful in blowing away dirt, oil or other residue, in many instances applies too much force on delicate or resilient parts to prevent an accurate measurement. In such cases, the air pressure is lowered to the order of 1 psi and this lower pressure is subsequently converted to a high pressure in order to actuate the follower.

However, even at this low pressure the apparatus cannot be used to gauge extremely thin sheets such as plastic film less than 0.001 inch thick. The breeze from the nozzle may blow away the sample and the Bernouille effect tends to lift the sample from its supporting platform.

Also, the gap in air gauging devices of this type is influenced to some degree by the smoothness or roughness of the surface of the work being gauged. Thus, there may be some ambiguity using a smooth gauge block as a standard for gauging work with a rough surface. The work surface which is rough or irregular thus has a varying thickness between a diminutive series of hills and valleys.

It is an object of the present invention to provide an attachment for use with air gauge followers which allows the follower to be used in gauging work of a thin, fragile nature. Another object of this invention is to provide an attachment for use with an air gauging system for gauging work characterized by a rough or irregular surface.

SUMMARY OF THE INVENTION

This invention features an attachment for use with an air gauge apparatus having a nozzle which directs a stream of air against the work surface to define an air gap therewith, comprising a thin, flexible, imperforate membrane stretched across the nozzle tip and means mounting the membrane so that it just touches the nozzle tip when there is no air in the system and defines a gap with the nozzle tip when air is delivered through the system and the diaphragm engages the work surface. The diaphragm and a cooperating mounting collar deflect the air away from the work, preventing displacement of thin, fragile films, for example, and averaging out measurements of irregular work surfaces.

DETAILED DESCRIPTION OF THE PREFERRED EMBODIMENTS

Figure 1:
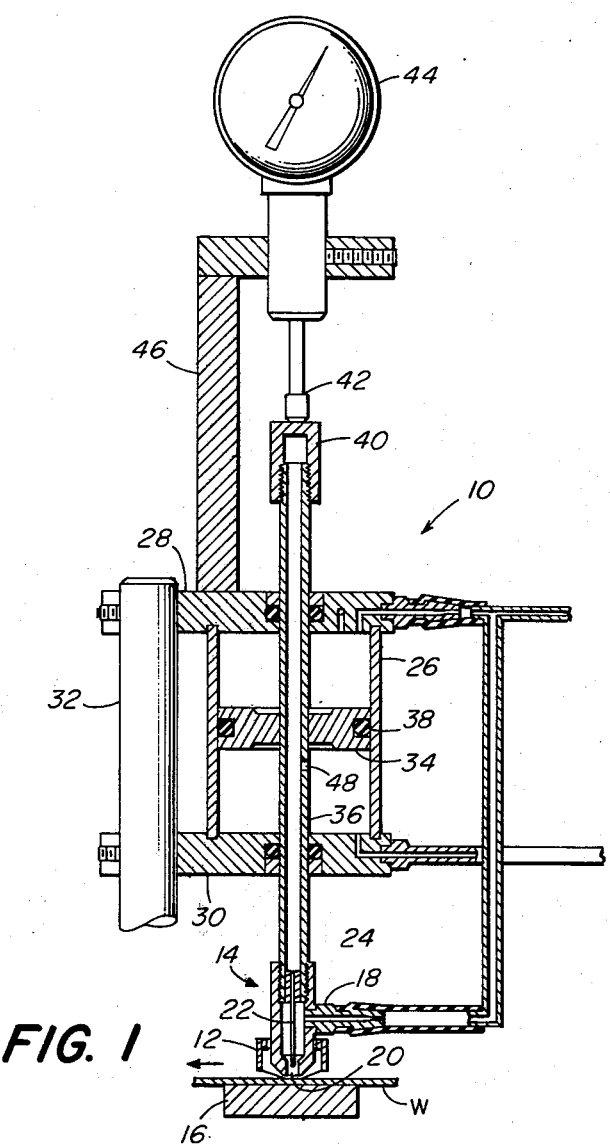
FIG. 1 is a sectional view in side elevation of an air gauging apparatus equipped with an attachment made according to the invention.
Figure 2:
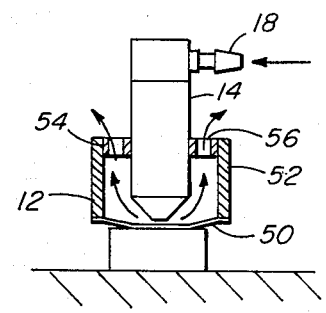
FIG. 2 is an enlarged sectional detail view in side elevation of the nozzle tip and attachment.
Figure 3:
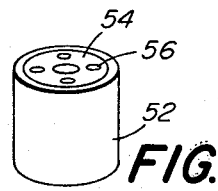
FIG. 3 is a perspective view of the attachment.

Referring now to the drawings and to FIG. 1 in particular, there is illustrated a pneumatic servo-mechanism or air gauging follower 10 of the sort disclosed in my U.S. Pat. No. 3,194,055 and to which is attached an accessory 12 made according to the present invention. The follower 10 comprises a nozzle indicated generally at 14 spaced adjacent to work W which typically is a part placed on a flat bearing surface 16. Most preferably, the nozzle 14 is of the extended range type disclosed in my U.S. Pat. No. 2,692,498, dated Oct. 26, 1954, entitled "Air Gauge" and having an air inlet 18, a gauge orifice 20, a tube 22 and a plug 24. While a fuller description of the operation of the nozzle may be obtained from U.S. Pat. No. 2,692,498, in general, air under pressure supplied to the inlet 18 exhausts through the orifice 20 against the work W, developing a work reflected back pressure in the tube 22 which varies inversely as the distance between the nozzle 14 and the work W. Such back pressure is communicated by suitable means to other parts of the apparatus to be described.

Means are provided for causing the nozzle 14 to follow or float at a uniform distance from the work W. The means comprise a pneumatic cylinder 26 having its upper and lower ends closed by manifolds 28 and 30, respectively, secured to a standard 32 supporting the entire apparatus. A piston 34 is mounted within the cylinder and is adapted to reciprocate therein. The piston is fitted with an elongated, hollow, open-ended piston rod or stem 36 fixed to it and extending lengthwise within the cylinder and projecting through openings in the manifolds. An O-ring 38 provides a fluid-tight, sliding seal between the piston and cylinder.

The lower end of the piston rod 36 is adapted to snuggly receive the plug 24 of the nozzle 14 threaded thereto. The upper end of the piston rod is closed by a cap 40 which bears against a push rod 42 of a standard dial indicator 44 supported by a bracket 46. The back pressure produced in the tube 22 of the nozzle 14 is effectively communicated to the interior of the piston rod 36 and thence through a port 48 in the rod wall at a point below the piston to the interior of the lower chamber of the cylinder.

Air under pressure is introduced to the upper cylinder chamber to provide a counterforce to the force due to nozzle back pressure for balancing the piston, thereby floating the nozzle at a uniform distance from the work W.

Changes in the condition of the work, such, for example, as an increase or decrease of the work thickness are accompanied by corresponding instantaneous changes in the work-reflected back pressure communicated to the lower cylinder chamber, causing the piston and the nozzle to shift up or down accordingly until the pressure in the lower chamber again equals that in the upper chamber, thereby maintaining a constant or uniform distance between the nozzle and the work. The movements of the piston rod thereby accurately reflect the condition changes and may be used to actuate mechanism for gauging and, when desired, for correcting or compensating for the condition changes. Thus, in the illustated embodiment, the dial indicator 44 will respond to the movement of the piston rod. The face of the gauge may be scaled and calibrated to present the desired work related information, such a direct reading of the work or work thickness, readings of deviation from a standard thickness or work postion, and the like.

In the above apparatus, non-contact gauging of the work is achieved with only a stream of air touching the part to be measured. The air gap between the nozzle tip and the part being gauged controls the position of the piston and also the dial indicator.

The air stream employed in a system of this type is commonly at a pressure of about 35 psi. The resulting air jet coming from the nozzle at this pressure exerts too much force on delicate or resilient parts to be able to obtain an accurate reading. Even when the pressure at the nozzle is lowered to 1 psi and an air pressure amplifier to control the follower, the low pressure is more than can be tolerated on such work as extremely thin plastic sheets less than 0.001 inch thick. Even these light air pressures blow away the work from the gauging position and the Bernouille effect produced by the air flow tends to lift the work from the supporting platform, making it impossible to gauge the work.

In accordance with the present invention, this problem is resolved by means of the attachment 12 placed over the nozzle tip. The attachment comprises a thin, flexible imperforate diaphragm 50, typically rubber, bonded as by cementing to the lower edge of an annular sleeve 52 having a length sufficient to extend over a substantial portion of the nozzle 14. The sleeve 52 is provided at its upper end with an inwardly extended annulus 54 fastened to the outer surface of the nozzle 14 by any suitable means such as cementing or the like. The annulus 54 is formed with a plurality of ports 56.

Figure 4:
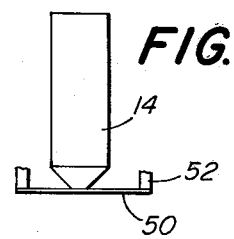
FIG. 4 is a view similar to FIG. 2 showing the attachment not under pressure.
Figure 5:
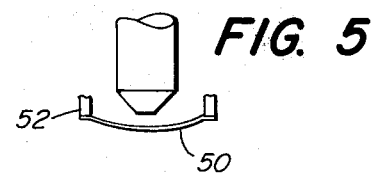
FIG. 5 is a view similar to FIG. 2 but showing the diaphragm under pressure.
Figure 6:
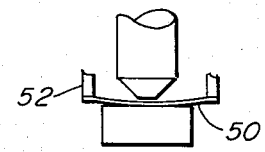
FIG. 6 is a view similar to FIG. 2 but showing the device in a normal operating condition, and, FIG. 7 is a view in perspective showing a modified diaphragm.

In practice, the attachment is mounted to the nozzle in such a manner that the lower edge of the collar 52 is substantially even with the lowermost tip of the nozzle so that the diaphragm 50, which is stretched across the lower end of the sleeve, will just touch and close the nozzle orifice when there is no air stream coming from the nozzle. The idle position of the diaphragm is shown in FIG. 4. When air is delivered through the nozzle, the diaphragm distends downwardly, expanding to form a gap which is appreciably greater than the normal gap required by the follower to take its equillibrium position. The distended condition of the diaphragm is shown in FIG. 5. Once the nozzle is placed in operative position with respect to a work base, as shown in FIG. 6, the nozzle is driven down until the normal gap is established. In this balanced condition the diaphragm flattens out against the surface of the work piece and the gap between the nozzle tip and the diaphragm is reduced to a normal gap.

The air released by the nozzle reverses its direction and is passing out through the ports 56, exhausting in a direction and at a distance from the work piece so as not to disturb the work piece.

it has been found that rubber may be employed as the diaphragm material and still maintain a constant thickness by virtue of the fact that the gauging apparatus is essentially of a comparative type rather than an absolute gauge. Furthermore, the zero point of the gauge is established by a gauge block or by moving the nozzle down to a supporting platform or other reference. Also, it is necessary only that the rubber thickness be the same for the periods of time between standardizing the gauge operation and, insofar as the piece of rubber is always the same section just under the nozzle, the precision thickness of the rubber material is not critical. Furthermore, the air pressure on the rubber diaphragm since the gap is always the same and the supply of air pressure is likewise always the same.

While the use of the attachment with the air gauging apparatus converts the apparatus from a non-contact gauging instrument to a contact type gauging instrument, the system is still far different from conventional contact gauging using metal anvils which deform even hard steel to an extent significant in measuring applications to the millionth of an inch. The soft rubber diaphragm generally pressed against the part will cause no significant deformation. Also, when the diaphragm is pressed against a rough surface it will produce a reading of thickness less than one corresponding to the hill tops and more than one corresponding to the valleys.

Figure 7:
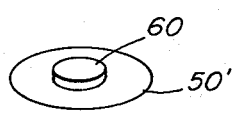

In measuring extremely thin film, this technique eliminates the need for flat, parallel anvils which are very difficult to produce and maintain for measuring in the millionths of an inch. The bottom anvil or platform need be only reasonably flat and there is no top anvil which must be parallel. The reading obtained by this gauging technique is to a degree an average for a rather small area under the nozzle. This area can be somewhat expanded by cementing a thin metal disc 60 to the center of a rubber diaphragm 50', as shown in FIG. 7. This metal disc will also prevent local deformation of the rubber, particularly if one wishes to use high pressure air on the nozzle.

While the invention has been described with particular reference to the illustrated embodiment, numerous modifications thereto will appear to those skilled in the art.

Having thus described the invention, what I claim and desire by Letters patent of the United States is:

1. An attachment for an air gauging apparatus having a nozzle having an orifice positioned in close proximity to the work being gauged and adapted to direct a flow of air through said orifice against said work to form a gap therewith, comprising
   a. a flexible diaphragm, and,
   b. means mounting said diaphragm to said nozzle and across said orifice,
   c. said diaphragm normally closing said orifice under an idle condition of said nozzle and forming a gap therewith and in contact with said work when under a pressurized condition,
   d. said mounting means including a tubular sleeve having an inside diameter greater than the outside diameter of said nozzle, said diaphragm being mounted across one end of said sleeve and a perforated annulus spaced from said one end mounted to said sleeve and adapted to engage said nozzle.

2. An attachment, according to claim 1, wherein said diaphragm is rubber.

3. An attachment, according to claim 1, including a rigid disc centrally mounted on a face of said diaphragm opposite said orifice.

4. An attachment, according to claim 3, wherein said disc is metal.

* * * * *